(12) United States Patent
Yotsumoto et al.

(10) Patent No.: US 10,132,451 B2
(45) Date of Patent: Nov. 20, 2018

(54) BULB-TYPE LIGHT SOURCE APPARATUS AND TRANSLUCENT COVER

(71) Applicant: SONY CORPORATION, Tokyo (JP)

(72) Inventors: Naoki Yotsumoto, Tokyo (JP); Takashi Sato, Tokyo (JP); Kazunori Kusuki, Kanagawa (JP); Masaki Ohno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/328,184

(22) PCT Filed: Nov. 6, 2014

(86) PCT No.: PCT/JP2014/005585
§ 371 (c)(1),
(2) Date: Jan. 23, 2017

(87) PCT Pub. No.: WO2016/035112
PCT Pub. Date: Mar. 10, 2016

(65) Prior Publication Data
US 2017/0219173 A1    Aug. 3, 2017

(30) Foreign Application Priority Data

Sep. 2, 2014   (JP) ................. 2014-177700

(51) Int. Cl.
| | | |
|---|---|---|
| *F21K 9/69* | (2016.01) | |
| *F21V 5/04* | (2006.01) | |
| *F21V 8/00* | (2006.01) | |
| *F21K 9/232* | (2016.01) | |
| *F21K 9/61* | (2016.01) | |
| *F21V 19/00* | (2006.01) | |
| *F21V 33/00* | (2006.01) | |
| *F21Y 115/10* | (2016.01) | |
| *F21Y 103/33* | (2016.01) | |

(52) U.S. Cl.
CPC ............... *F21K 9/69* (2016.08); *F21K 9/232* (2016.08); *F21K 9/61* (2016.08); *F21V 5/04* (2013.01);
(Continued)

(58) Field of Classification Search
CPC ... F21K 9/69; F21K 9/61; F21K 9/232; F21V 5/04; F21V 19/0035; F21V 33/0056;
(Continued)

(56) References Cited

U.S. PATENT DOCUMENTS 7,604,378 B2 * 10/2009 Wolf .................. A01M 1/2083
  362/227
2005/0195600 A1 * 9/2005 Porchia .................... A61L 9/03
  362/240

(Continued)

FOREIGN PATENT DOCUMENTS

JP    2008-251512 A    10/2008
JP    2012-59370 A     3/2012
(Continued)

OTHER PUBLICATIONS

International Search Report prepared by the Japan Patent Office dated Jan. 15, 2015, for International Application No. PCT/JP2015/005585.

*Primary Examiner* — Bao Q Truong
(74) *Attorney, Agent, or Firm* — Sheridan Ross P.C.

(57) ABSTRACT

According to an embodiment of the present technology, there is provided a bulb-type light source apparatus including a light source unit, a translucent cover, and a base unit. The translucent cover includes a first area including a convex lens function and a second area including a concave lens function. The base unit supports the light source unit and the translucent cover such that the second area is positioned closer to the light source unit than the first area.

18 Claims, 9 Drawing Sheets

(52) U.S. Cl.
CPC ...... *F21V 19/0035* (2013.01); *F21V 33/0056* (2013.01); *G02B 6/005* (2013.01); *G02B 6/0045* (2013.01); *F21Y 2103/33* (2016.08); *F21Y 2115/10* (2016.08)

(58) Field of Classification Search
CPC ............. F21V 2200/00; F21V 2200/15; F21V 2200/40; F21V 2200/17; G02B 6/0045; G02B 6/005; G02B 6/0096; F21Y 2103/33; F21Y 2115/10
See application file for complete search history.

(56) References Cited

U.S. PATENT DOCUMENTS

| | | | |
|---|---|---|---|
| 2011/0101861 A1* | 5/2011 | Yoo | F21V 3/02 315/35 |
| 2012/0106127 A1 | 5/2012 | Hattori et al. | |
| 2012/0306366 A1* | 12/2012 | Sakai | F21V 23/009 315/51 |
| 2012/0307513 A1* | 12/2012 | Li | G02B 6/0045 362/555 |
| 2013/0027939 A1* | 1/2013 | Hisayasu | F21V 17/164 362/249.02 |
| 2014/0153249 A1* | 6/2014 | Hisayasu | F21V 3/02 362/294 |
| 2014/0313741 A1* | 10/2014 | Sun | F21K 9/52 362/311.02 |

FOREIGN PATENT DOCUMENTS

| | | |
|---|---|---|
| JP | 2012-99362 A | 5/2012 |
| JP | 2012-227018 | 11/2012 |
| JP | 2013-069884 | 4/2013 |
| WO | WO 2013/105169 A1 | 7/2013 |
| WO | WO 2013/161164 A1 | 10/2013 |

* cited by examiner

BULB-TYPE LIGHT SOURCE APPARATUS
AND TRANSLUCENT COVER

CROSS REFERENCE TO RELATED APPLICATIONS

This application is a national stage application under 35 U.S.C. 371 and claims the benefit of PCT Application No PCT/JP2014/005585 having an international filing date of 6 Nov. 2014, which designated the United States, which PCT application claimed the benefit of Japanese Patent Application No. 2014-177700 filed 2 Sep. 2014, the disclosures of which are incorporated herein by reference in their entirety.

TECHNICAL FIELD

The present technology relates to a bulb-type light source apparatus and a translucent cover used is the bulb-type light source apparatus.

BACKGROUND ART

There are light source apparatuses each including a light source and a globe that transmits light from the light source. For example, Patent Literature 1 discloses a lighting fixture that receives light emitted from an LED (Light Emitting Diode) via concave sections formed on a globe and diffuses the light. Patent Literature 2 discloses an illumination device that reflects light that has been emitted from an LED and entered a globe on a reflective surface formed by a recess provided on the globe to cause the light to exit the illumination device. According to the illumination device disclosed in Patent Literature 2, light distribution can be widened to a light-emitting direction of light reflected onto the curved reflective surface.

There is also Patent Literature 3 below as a literature related to the present technology.

CITATION LIST

Patent Literature

Patent Literature 1: Japanese Patent Application Laid-open No. 2012-227018
Patent Literature 2: Japanese Patent Application Laid-open No. 2013-69884
Patent Literature 3: International Patent Publication No. 2013/105169

DISCLOSURE OF INVENTION

Technical Problem

As disclosed in Patent Literatures 1 and 2, the globe provided in the light source apparatus may include a function of diffusing light from the light source and widening light distribution.

It is sometimes favorable to design a light distribution property of the light source apparatus depending on purposes disregard the examples above.

The present technology aims at providing a bulb-type light source apparatus having a new light distribution property and a translucent cover used in the bulb-type light source apparatus.

Solution to Problem

According to the present technology, there is provided a bulb-type light source apparatus including a light source unit, a translucent cover, and a base unit.

The translucent cover includes a first area including a convex lens function and a second area including a concave lens function.

The base unit supports the light source unit and the translucent cover such that the second area is positioned closer to the light source unit than the first area.

Since the second area is positioned closer to the light source unit than the first area, a bulb-type light source apparatus having a new light distribution property can be realized.

The light source unit may be formed annularly, and the first area and the second area may be provided about a virtual center axis that passes a center of the ring.

With this configuration, it is possible to obtain a light distribution property by the first area and the second area in a circumferential direction of the light source unit.

The bulb-type light source apparatus may further include a functional component supported by the base unit.

The functional component may be arranged at a position that passes the center axis, and the first area and the second area may be arranged in a periphery of the functional component.

Even when the functional component is arranged at a position that passes the center axis of the light source unit, an illuminances on a front side, that is, an immediate-below illuminance, can be raised and a uniform illuminance can also be obtained in a periphery of the immediate-below area by the special light distribution property obtained by the first area and the second area.

The translucent cover may include a first end portion that forms an opening where the functional component is arranged, and a second end portion provided on the other side of the first end portion in a direction of the center axis.

The first area may be provided at the first end portion, and the second area may be provided across an area between the first area and the second end portion.

Even when the functional component is arranged at a position that passes the center axis of the light source unit, the immediate-below illuminance can be raised. Further, since the second area is provided between the first end portion and the second end portion, the illuminance of light emitted from an entire side portion of the translucent cover can be uniformized.

An average thickness of the first area may be larger than that of the translucent cover.

The bulb-type light source apparatus may further include a cylindrical light guide plate including an outer surface, a light-incident end surface opposing the light source unit, and an optical pattern portion configured to emit, from the outer surface, light that has entered from the light-incident end surface.

The cylindrical light guide member is capable of taking in light emitted from the light source unit via the light-incident end surface and converting it into light emitted from the outer surface of the light guide member. Accordingly, a wide light distribution angle can be realized.

The light guide plate may include an end edge that is provided on the other side of the light-incident end surface and opposes the first area.

The translucent cover may include an apex at a position included in the first area on the other side of a side where the light source unit is arranged. The apex may be arranged at a position deviated from a virtual extended line extending from the end edge in a direction extending from the light-incident end surface to the end edge along the side surface.

With such a configuration, it is possible to prevent light that leaks from the end edge of the light guide plate from entering the apex and suppress unexpected illumination unevenness due to the incident light.

The translucent cover may include a first end portion, and a second end portion that is provided on the other side of the first end portion in a direction of the center axis and includes an opening provided closer to the light source unit than the first end portion. Further, a diameter of the opening of the second end portion may be a maximum inner diameter of the translucent cover.

With this configuration, demolding from the opening of the second end portion becomes possible. In other words, the translucent cover including the first area and the second area can be produced by injection molding.

The first area may be further arranged at a position where the center axis passes.

With this configuration, it becomes possible to realize a bulb-type light source apparatus with which the illuminance on the front side (immediate-below illuminance) is raised and as optical illuminance from the side portion is weakened.

According to the present technology, there is provided a translucent cover used is a bulb-type light source apparatus including a light source unit and a base unit that supports the light source unit, the translucent cover including a first area including a convex lens function and a second area including a concave lens function.

The translucent cover is supported by the base unit such that the second area is positioned closer to the light source unit than the first area.

Advantageous Effects of Invention

As described above, according to the present technology, it becomes possible to realize a bulb-type light source apparatus having a new light distribution property and a translucent cover used in the bulb-type light source apparatus.

It should be noted that the effects described herein are not necessarily limited, and any effect described in the present disclosure may be obtained.

MODES FOR CARRYING OUT THE INVENTION

Hereinafter, embodiments of the present technology will be described with reference to the drawings.

Overall Configuration of Bulb-Type Light Source Apparatus

Figure 1:
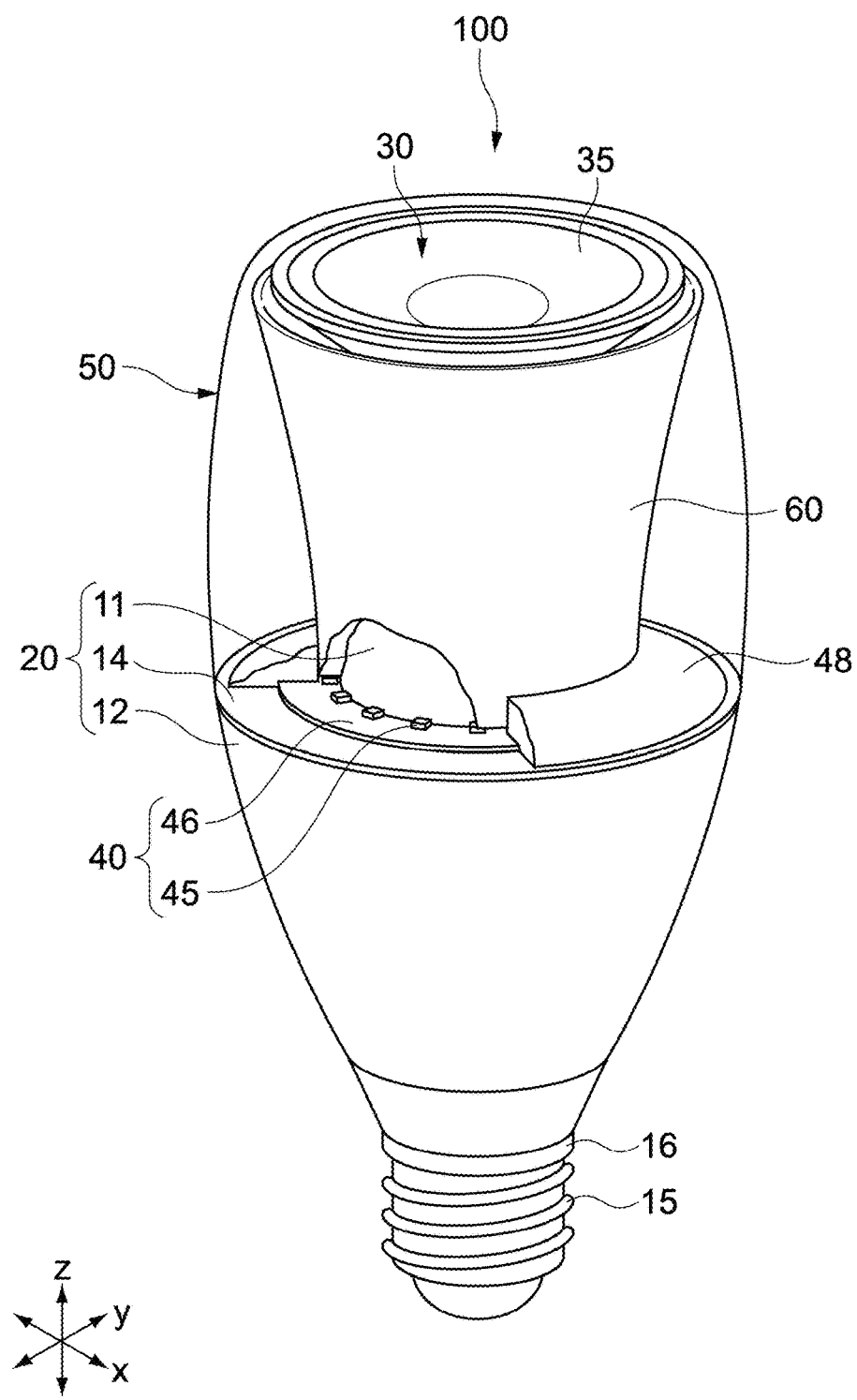
FIG. 1 is a perspective view of a bulb-type light source apparatus according to an embodiment of the present technology.
Figure 2:
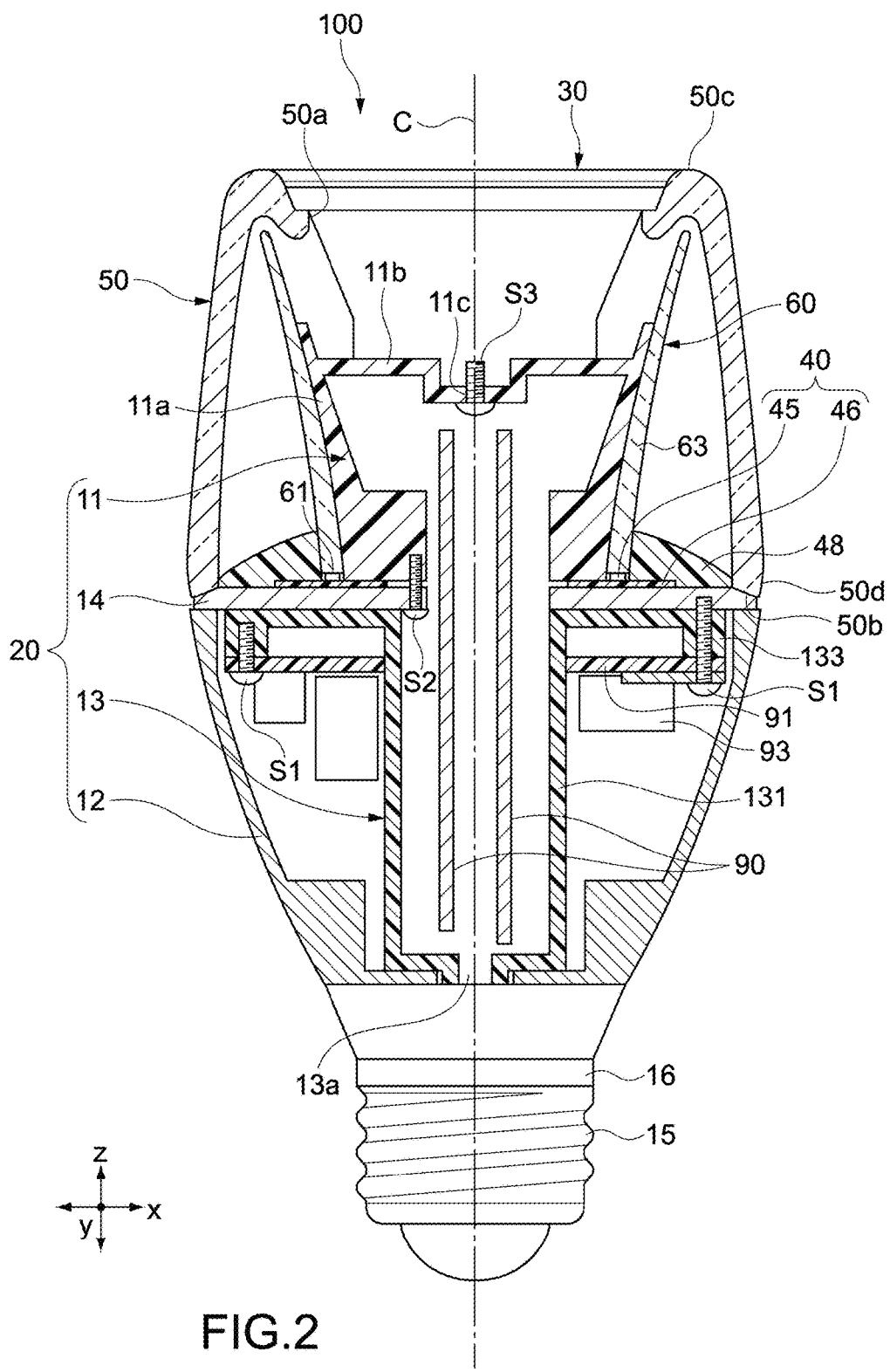
FIG. 2 is a schematic cross-sectional diagram of the bulb-type light source apparatus shown in FIG. 1.

FIG. 1 is a perspective view of a bulb-type light source apparatus according to an embodiment of the present technology. FIG. 2 is a schematic cross-sectional diagram of the bulb-type light source apparatus shown in FIG. 1. In descriptions below, the bulb-type light source apparatus will simply be referred to as light source apparatus.

The light source apparatus 100 includes a base unit 20, a light source unit 40, a speaker 30 as a functional component provided on one end side in a z-axis direction, and a translucent cover 50. The light source apparatus 100 also includes a cap 15 provided on the other end side in the z-axis direction (on the other side of speaker 30) via an electrical insulation ring 16.

For brevity of explanation, in descriptions below, a direction extending along the z axis in FIGS. 1 and 2 will be referred to as longitudinal direction of the light source apparatus 100. Specifically, the speaker 30 side of the light source apparatus 100 will be referred to as front, and the cap 15 side of the light source apparatus 100 will be referred to as rear.

Figure 3:
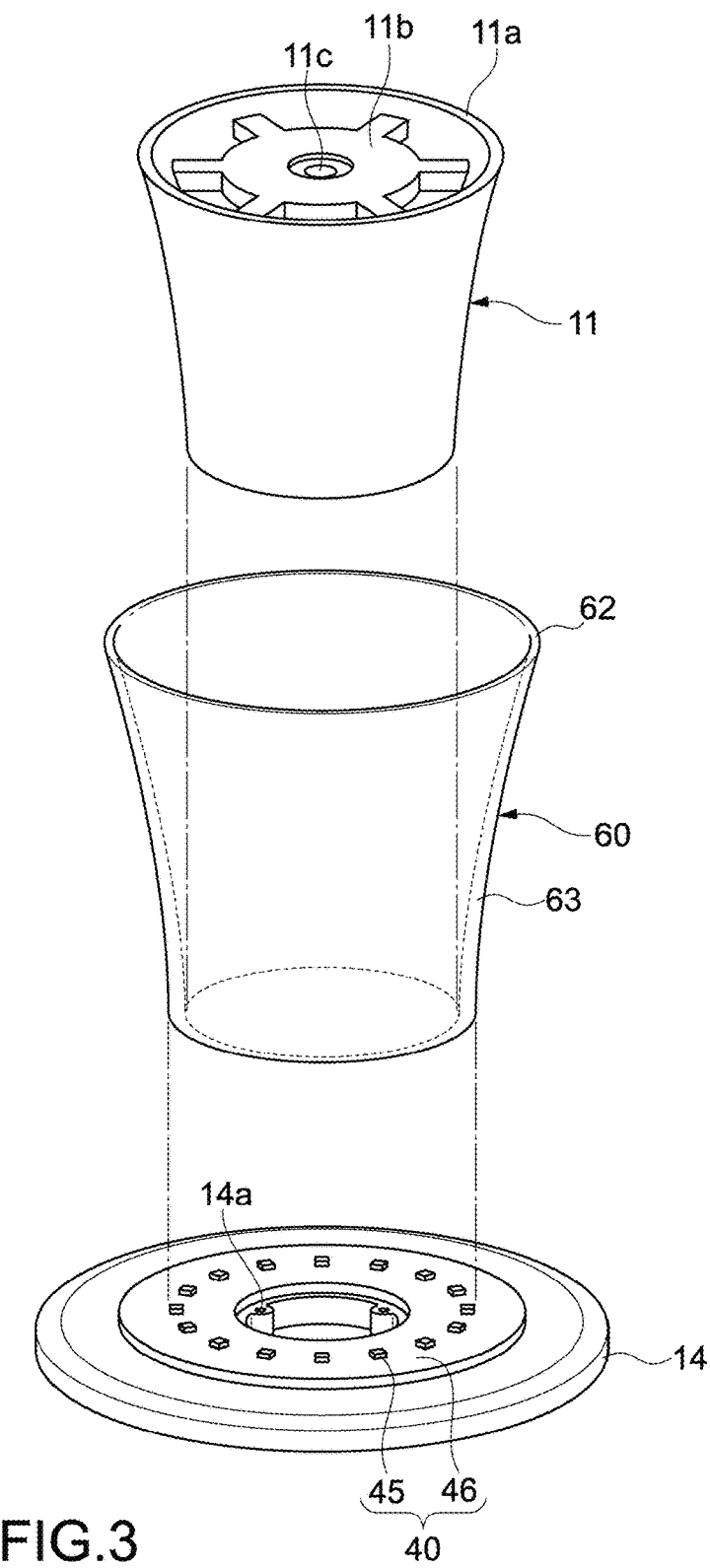
FIG. 3 is a perspective view showing a holding member, a light guide plate, and a light source unit.

As shown in FIG. 2, the base unit 20 includes a function of supporting at least the light source unit 40 and the translucent cover 50. Specifically, the base unit 20 includes a base casing 12 including an opening on the front side and a heatsink 14 that is provided so as to cover the opening of the base casing 12, comes into contact with the light source unit 40, and supports the translucent cover 50. The base unit 20 also includes a holding member 11 that is fixed onto the heatsink 14 and holds the speaker 30 and a substrate accommodation box 13 that accommodates various circuit substrates 90 to be described later. The base casing 12 has a high thermal conductivity and is in contact with the heatsink 14. As shown in FIG. 3, the heatsink 14 and the holding member 11 are fixed to each other by screws S2 via screw holes 14a (see FIG. 3) formed on the heatsink 14, for example.

A first opening 50a provided at a first end portion 50c on the front side and a second opening 50b provided at a second end portion 50d on the other side in the z-axis direction are formed in the translucent cover 50. The speaker 30 is attached to the translucent cover 50 such that the speaker 30 blocks the first opening 50a. The base casing 12 is connected to the second opening 50b side of the translucent cover 50 via the heatsink 14. The translucent cover 50 is formed of a material that can be injection-molded as will be described later, such as acrylic and polycarbonate.

The heatsink 14 is arranged about a virtual center axis C (see FIG. 2) as an axis that passes a center of the speaker 30 along a vibration direction (z-axis direction) of a vibration plate 35 (see FIG. 1) included in the speaker 30. The heatsink 14 has a plate-like shape and is formed annularly around an entire circumference of the center axis C.

The light source unit 40 is also arranged about the center axis C similar to the heatsink 14, is typically provided annularly (see FIG. 3), and is arranged on the heatsink 14. In other words, the center axis C is an axis that passes the center of the annular light source unit 40, and the heatsink 14 and the light source unit 40 are arranged concentrically.

For example, the light source unit 40 includes an annular mounting substrate 46 and a plurality of LED (Light Emitting Diode) devices 45 arranged on a circumference of the mounting substrate 46. A device that emits white light is used as each of the LED devices 45, but devices that emit a unicolor other than white or a plurality of colors may be used instead.

As shown in FIG. 2, the substrate accommodation box 13 includes a body 131 and a flange contact portion 133 provided so as to protrude from the body 131 in a direction vertical to the z axis. The plurality of circuit substrates 90 are arranged inside the body 131. The flange contact portion 133 is in contact with the heatsink 14. Specifically, an annular power supply circuit substrate 91 is mounted on and connected to the flange contact portion 133, and the flange contact portion 133 and the power supply circuit substrate 91 are connected and fixed to the heatsink 14 via a plurality of screws S1 and the like. It should be noted that a component 93 configuring a power supply circuit is mounted on the power supply circuit substrate 91.

A screw hole 13a is provided on a rear side of the body 131 of the substrate accommodation box 13. The substrate accommodation box 13 and the base casing 12 are connected and fixed to each other by a screw (not shown).

For example, a drive circuit for the light source unit 40, a drive circuit for the speaker 30, a wireless communication circuit, and the like are mounted on the plurality of circuit substrates 90.

The light source apparatus 100 includes a light guide plate 60 as a light guide member arranged opposed to the light source unit 40. The light guide plate 60 is cylindrical as a whole and configured to uniformly emit light from the light source unit 40 from an outer surface thereof. By providing the light guide plate 60, a wide light distribution angle can be realized. Specifically, the light guide plate 60 includes an optical pattern portion having a light diffusion function on a side surface 63 thereof (inner surface and outer surface). The light diffusion function is realized by, for example, serigraph, emboss processing, and blast processing.

FIG. 3 is a perspective view showing the holding member 11, the light guide plate 60, and the light source unit 40. The holding member 11 includes a cylindrical side wall 11a and a support plate 11b that is provided inside the cylinder and supports the speaker 30. The light guide plate 60 is fixed to the holding member 11 such that the holding member 11 is within the side wall 63 of the light guide plate 60. A shape of an outer surface of the side wall 11e of the holding member 11 and that of an inner surface of the side wall 63 of the light guide plate 60 are in an approximate similarity relationship.

The outer surface of the side wall 11a of the holding member 11 includes a function as a reflection surface that reflects light. By forming the reflection surface as a mirror surface or coloring it in white, the reflection surface is given high optical reflectance.

A screw hole 11c for fixing the speaker 30 by a screw S3 is formed on the support plate 11b.

As shown in FIGS. 1 and 2, an annular cover 48 is attached around the side wall 63 of the light guide plate 60 on the mounting substrate 46 of the light source unit 40. The cover 48 includes a function of hiding the mounting substrate 46. Similar to the outer surface of the side wall 11a of the holding member 11, a front surface (surface on front side) of the cover 48 is configured to have high reflectance.

Configuration of Translucent Cover

In this embodiment, the speaker 30 is arranged in an irradiation direction of the light source unit 40. Therefore, when no measure is taken, the speaker 30 blocks light from the lit light source unit 40 and a shadow of the speaker 30 is reflected on an irradiation surface, to thus impair an illumination function. In this regard, the present technology realizes the translucent cover 50 configured as follows to secure the illumination function.

Figure 4:
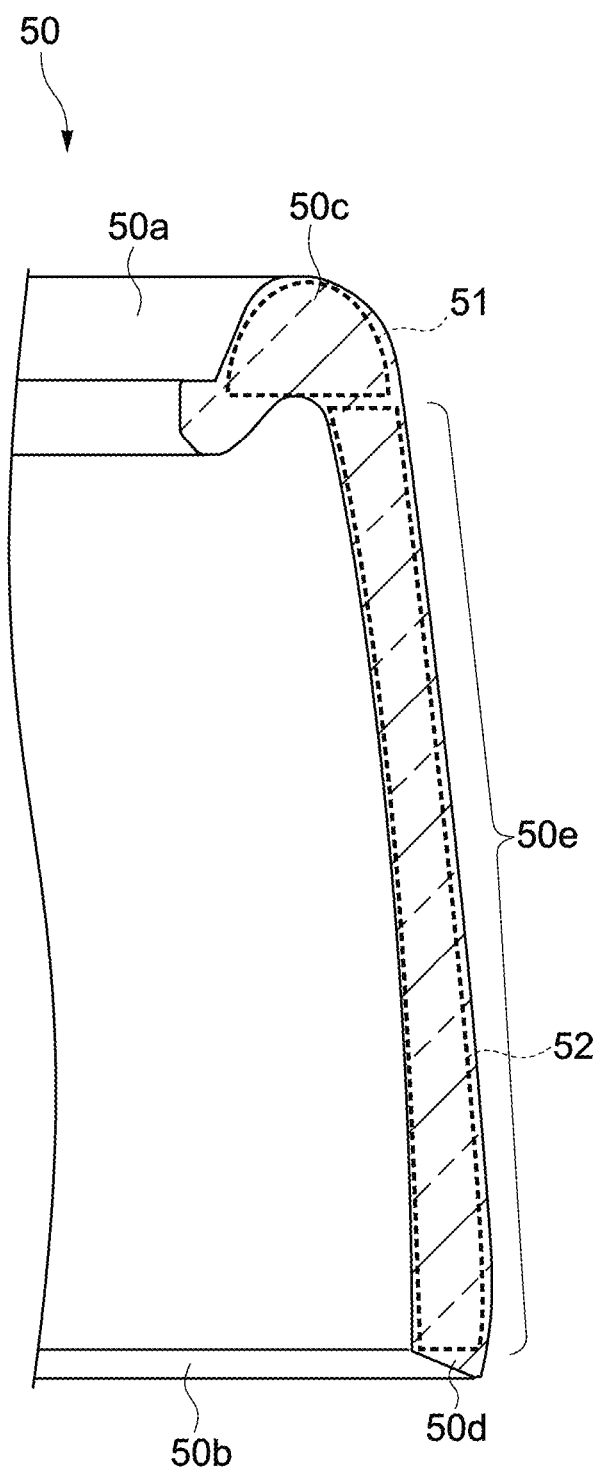
FIG. 4 is a cross-sectional diagram showing a part of a translucent cover.

FIG. 4 is a cross-sectional diagram showing a part of the translucent cover 50. The translucent cover 50 has thicknesses that differ depending on areas. The translucent cover 50 includes a first area 51 including a convex lens function and a second area 52 including a concave lens function. Of the base unit 20, the heatsink 14 supports the light source unit 40 and the translucent cover 50 such that the second area 52 is positioned closer to the light source unit 40 than the first area 51. Specifically, the first area 51 is provided at the first end portion 50c far from the light source unit 40, and the second area 52 is provided at a side portion 50e close to the light source unit 40. The second area 52 is provided across an area between the first area 51 and the second end portion 50d.

The first area 51 and the second area 52 are provided about the center axis C (see FIG. 2). In other words, the first area 51 and the second area 52 are provided about the speaker 30 arranged at a position that passes the center axis C.

An average thickness of the first area 51 is designed to be larger than that of the entire translucent cover 50. An average thickness of the second area 52 is designed to be smaller than that of the entire translucent cover 50.

Figure 5A:
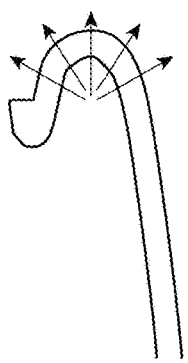
FIGS. 5A to 5C are diagrams for explaining light distribution of a translucent cover formed with a uniform thickness, as Comparative Example 1 of the translucent cover according to this embodiment.
Figure 5B:
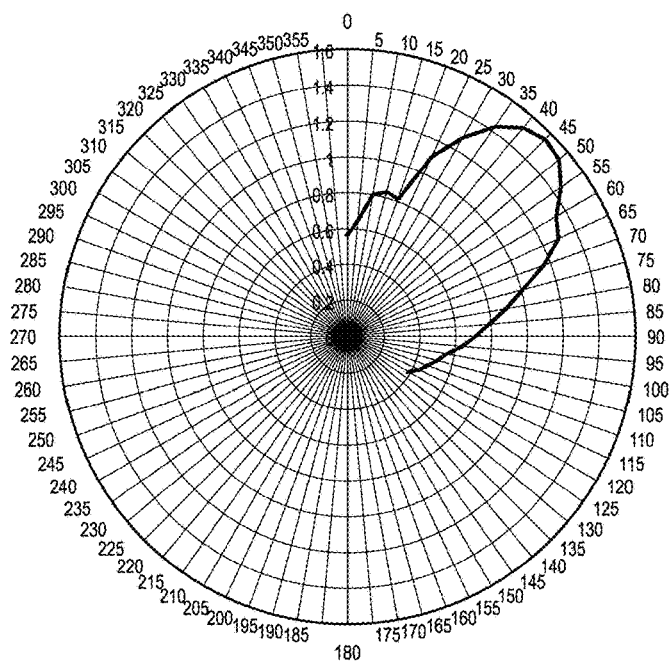
Figure 5C:
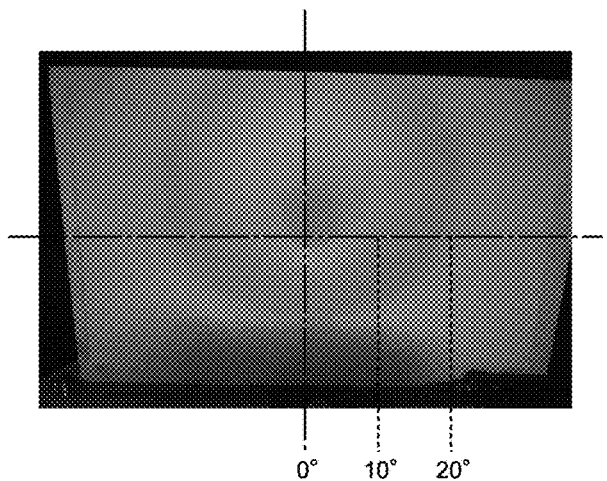

FIGS. 5A to 5C are diagrams for explaining light distribution of a translucent cover formed with a uniform thickness, as Comparative Example 1 of the translucent cover 50 according to this embodiment. FIG. 5A shows a light distribution direction of an area including a front side of the translucent cover according to Comparative Example 1. FIG. 5B shows a light distribution property in a case where this translucent cover is used. FIG. 5C shows a photograph of an actual irradiation surface. In the case of such a translucent cover having a uniform thickness, a light amount in the vicinity of 0 to 5° is small. This is because the speaker 30 is arranged on the front side as described above, and the speaker 30 blocks light that has exited a center area.

Figure 6A:
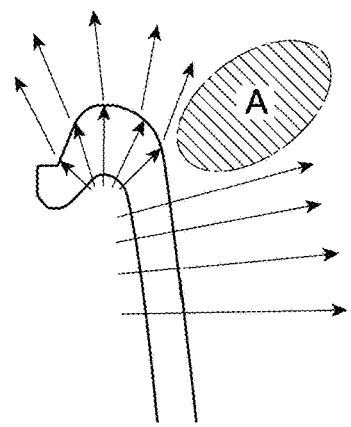
FIGS. 6A to 6C are diagrams showing a translucent cover according to Comparative Example 2 that has a convex lens function at an end portion on a front side for solving the problem of Comparative Example 1.
Figure 6B:
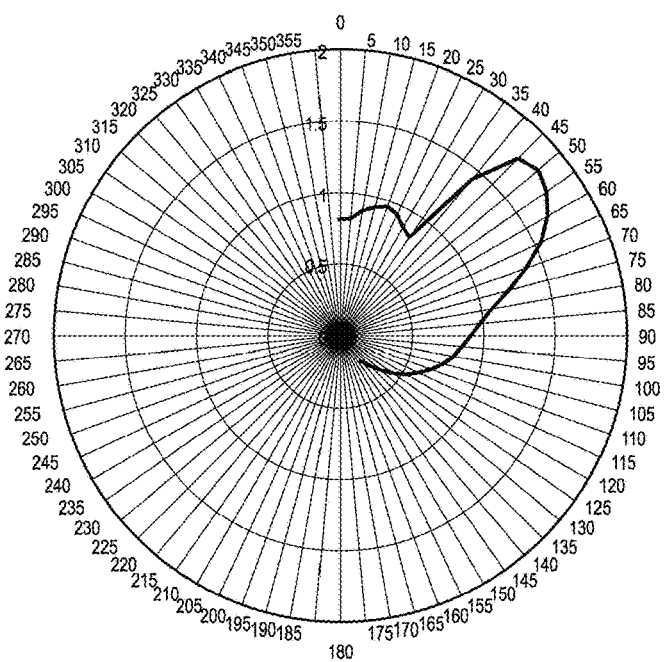
Figure 6C:
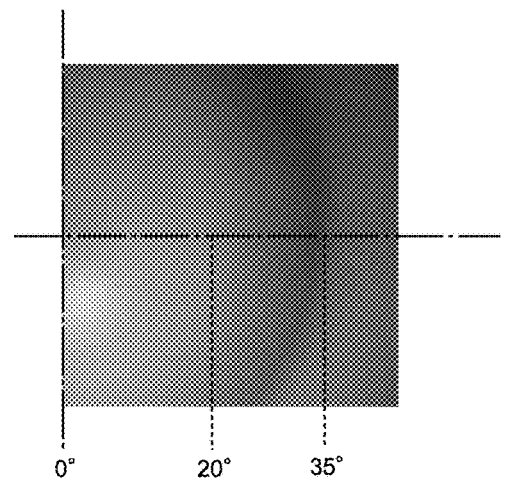

FIGS. 6A to 6C are diagrams showing a translucent cover according to Comparative Example 2 that has a convex lens function at an end portion on a front side for solving the problem of Comparative Example 1. A side portion of the translucent cover has a uniform thickness. With this configuration, light that has passed an area having the convex lens function is refracted in a direction in which light is collected. As a result, it becomes possible to increase the light amount in the vicinity of 0 to 5° as shown in FIG. 6B and eliminate a shadow caused by the speaker 30 or reduce an influence of the shadow.

However, with the translucent cover according to Comparative Example 2, there is a problem that, since light is collected by the convex lens function, a light amount in a forward oblique area (e.g., in the vicinity of 20 to 35°) is lowered that much. In addition, in an area of 35° or more, the light amount increases in the periphery of the side portion due to light emitted from the side portion. As a result, a shadow is caused due to a contrast in the vicinity of a boundary between the immediate-below area and the forward oblique area as shown in FIG. 6C. In FIG. 6A, the area where the light amount is lowered (in the vicinity of 20 to 35°) is an area A indicated by hatched lines.

Figure 7A:
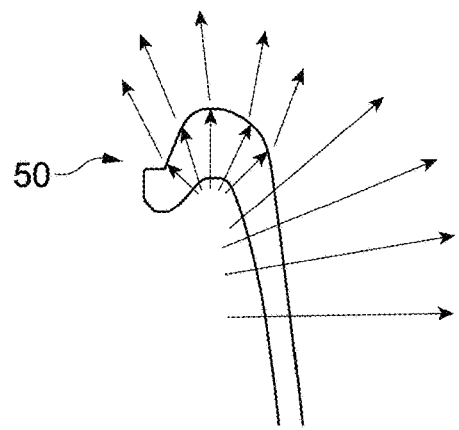
FIGS. 7A to 7C show light distribution of the translucent cover of this embodiment.
Figure 7B:
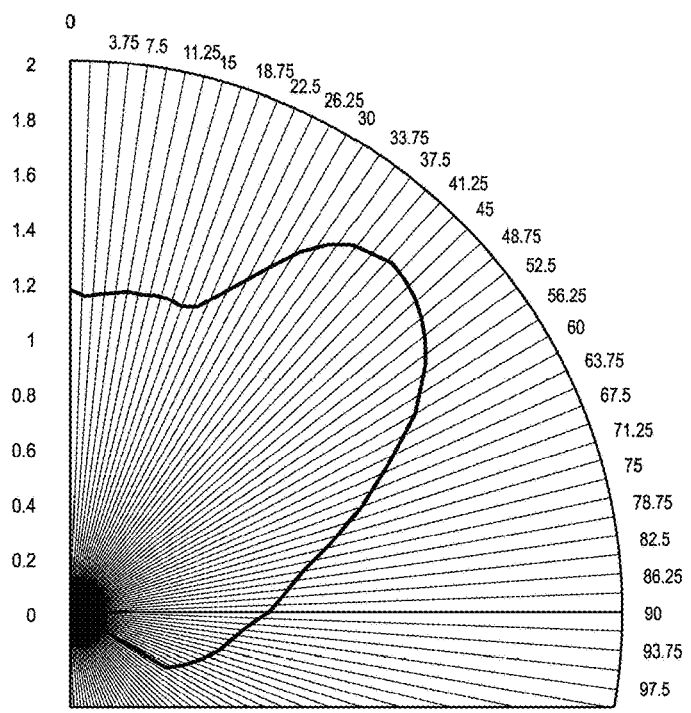
Figure 7C:
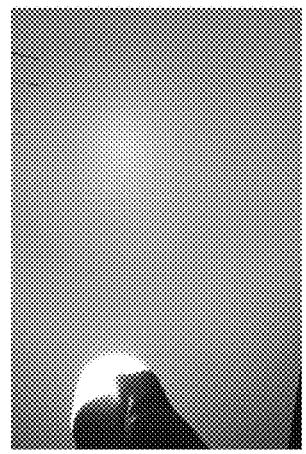

FIGS. 7A to 7C show light distribution of the translucent cover of this embodiment. As described above, a favorable light distribution property as shown in FIGS. 7B and 7C can be obtained by the translucent cover 50 including the first area 51 and the second area 52. Specifically, by the convex lens function of the first area 51, light that passes the first area 51 can be collected to thus raise the light amount in the center area (in the vicinity of 0 to 5°), that is, the immediate-below illuminance. In addition, by the concave lens function of the second area 52, light emitted from the side portion 50e is diffused to thus uniformize the light amount in the area of 5° or more.

As described above, by the special light distribution property obtained by the translucent cover 50 having a special shape, it is possible to obtain a uniform illuminance in the periphery of the side portion 50e of the translucent cover 50 while raising the immediate-below illuminance. Moreover, since the entire second area 52 including the concave lens function is an area that substantially coincides with the entire side portion 50e, the illuminance of light emitted from the entire side portion 50e of the translucent cover 50 can also be uniformized.

Figure 8:
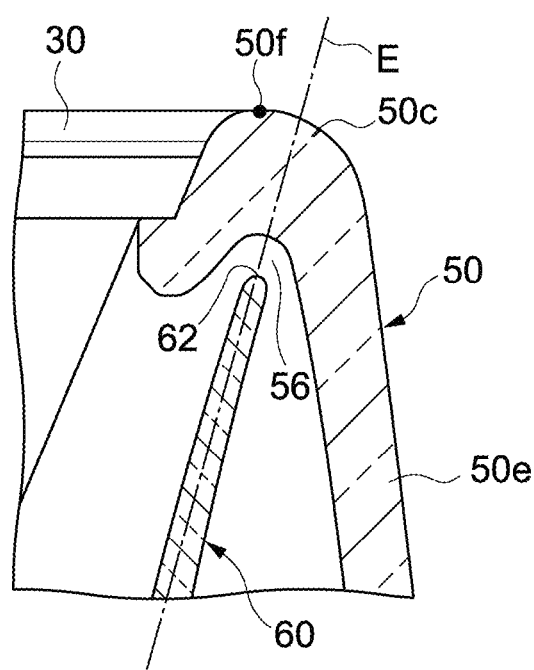
FIG. 8 is a cross-sectional diagram for explaining an arrangement relationship between a light guide plate and the translucent cover, the diagram showing a part of those members on the front side.

FIG. 8 is a cross-sectional diagram for explaining an arrangement relationship between the light guide plate 60 and the translucent cover 50, the diagram showing a part of those members on the front side. An end edge 62 of the light guide plate 60 on the other side of a side where the light source unit 40 is arranged (front side) is arranged so as to oppose the first area 51 of the translucent cover 50. For example, the translucent cover 50 includes an annular groove 56 formed by the first area 51 and the first opening 50a. The end edge 62 of the translucent cover 50 is fit into the groove 56 while the end edge 62 is not brought into contact with the translucent cover 50.

At the first end portion 50c of the translucent cover 50, a position of an apex 50f located at the very front is deviated from a straight virtual extended line E extending from a light-incident end surface 61 (see FIG. 2) of the light guide plate 60 toward the end edge 62 along the side wall (outer surface or inner surface). Although the position of the apex 50f is deviated inwardly from the extended line E in this embodiment, the position may instead be deviated outwardly from the extended line E.

Alternatively, instead of extending from the light-incident end surface 61, the extended line E may be an extended line extending from ½ the height of the light guide plate 60 in the z direction or ⅔ the entire height in the z direction to the end edge 62 using the light-incident end surface as a reference, for example.

The light guide plate 60 includes a function of uniformly emitting surface-emitted light from the outer surface thereof. However, even when light leaks from the end edge 62, unexpected illuminance unevenness due to light leakage can be suppressed by the arrangements and configurations of the light guide plate 60 and the translucent cover 50 as described above.

Method of Producing Translucent Cover
(Demolding Condition)

There are roughly two methods as a method of producing a translucent cover (globe) of a general bulb-type LED lighting. One is a method of expanding and molding a polycarbonate plate having a uniform thickness by blow molding. By incorporating a diffusive filler in the polycarbonate material and making it translucent, the polycarbonate material is given a light diffusion property. A balance between translucency and diffuseness is taken based on a filler content rate.

The other is a molding method of expanding a glass material. In this case, the thickness inside the cover becomes non-uniform, but since the method of expanding melted glass is used, the method differs from the production method in which the thickness itself is adjusted intentionally as in this embodiment. In general, when using a glass material, it is possible to obtain both the translucency and diffuseness by using milky glass or applying a diffusive coating material inside a cover after molding transparent glass.

Since the translucent cover 50 of this embodiment is adjusted such that thicknesses thereof differ depending on areas, it is desirable to form the translucent cover 50 by injection molding. With the general production methods described above, it is difficult to adjust the thickness. In the case of injection molding, there is a need to perform demolding on the inside of the translucent cover 50 and remove the mold from the second opening 50b. Therefore, the diameter in the vicinity of the second opening 50b is designed to be a maximum inner diameter of the translucent cover 50.

Translucent Cover According to Another Embodiment

Figure 9:
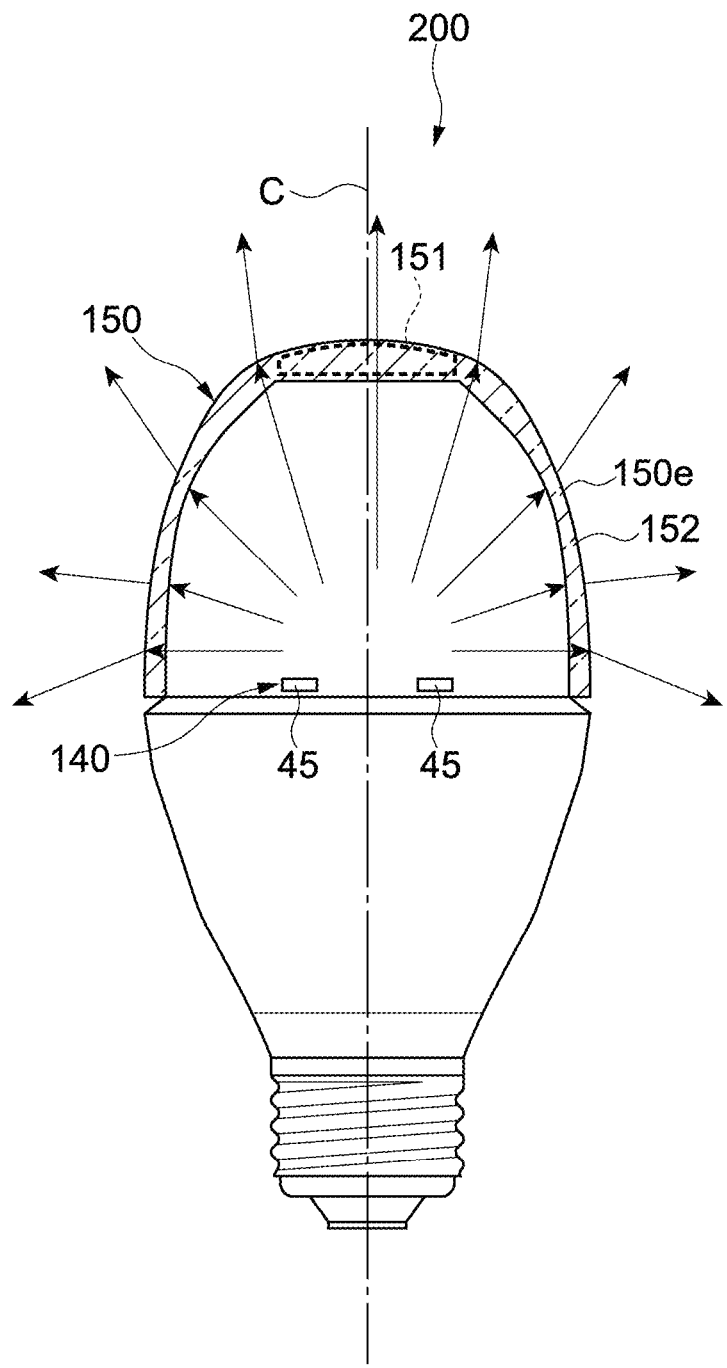
FIG. 9 is a partial cross-sectional diagram showing a bulb-type light source apparatus equipped with a translucent cover according to another embodiment.

FIG. 9 is a partial cross-sectional diagram showing a bulb-type light source apparatus equipped with a translucent cover according to another embodiment. The bulb-type light source apparatus 200 does not include the functional component (speaker 30) as in the embodiment above. A translucent cover 150 includes a first area 151 including a convex lens function and a second area 152 including a concave lens function. In the translucent cover 150, the first area 151 is provided in an area including a position where the center axis C passes, and the second area 152 is provided about the center axis C at a position closer to a light source unit 140 than the first area 151.

In this embodiment, the first area 151 is provided at a center of a front-side end portion of the translucent cover 150. The second area 152 is provided across an area between the first area 151 and an opening 150b at a rear-side end portion.

As shown in the figure, the light source unit 140 may include a plurality of point light sources (LED devices 45) arranged annularly. Alternatively, the light source unit 140 may include one or a plurality of point light sources arranged substantially at the center.

As described above, the translucent cover 150 of this embodiment is applicable to a general bulb-type LED lighting. Accordingly, it becomes possible to realize a bulb-type light source apparatus 200 with which the illuminance on the front side (immediate-below illuminance) is raised and an optical illuminance from a side portion 150e is weakened. In this case, since the second area 152 including the concave lens function is provided at the side portion 150e by the principle described above, a difference in the illuminance due to a light intensity difference at a boundary between the first area 151 and the side portion 150e can be suppressed.

Other Embodiments

The present technology is not limited to the embodiments above, and various other embodiments can also be realized.

In the embodiment above, the light source unit 40 and the translucent cover 50 are configured to be supported by the heatsink 14 as one component configuring the base unit 20. However, those may be supported by the base casing 12 and the like or other components out of the components configuring the base unit 20.

The shape and configuration of the base unit 20 are not limited to the embodiment above. Moreover, the base unit may be configured by a single component.

The light source unit 40, the heatsink 14, and the like are formed annularly, but annular shapes other than a circle may be adopted instead. Annular shapes other than a circle include a polygon including three or more sides and a circular or polygonal shape formed discontinuously in a circumferential direction, for example.

In the translucent covers 50 and 150, the second areas 52 and 152 each including a concave lens function are respectively provided across the entire side portions 50e and 150e. However, the second area including the concave lens function may also be provided annularly at a part of the side portion.

The light source apparatus of the embodiment above includes the speaker 30 as the functional component, but other functional components may be included in place of the speaker 30. Other functional components include, for example, an image sensor, an optical sensor, an ultrasonic sensor, a radiation sensor, a temperature sensor, and the like.

The light source unit includes so-called light-emitting diodes as LED devices, but devices capable of emitting surface-emitted light, such as an organic LED, may be used instead.

Of the feature portions of the embodiments described above, at least two of the feature portions can be combined.

It should be noted that the present technology can also take the following configurations.

(1) A bulb-type light source apparatus, including:
a light source unit;
a translucent cover including a first area including a convex lens function and a second area including a concave lens function; and
a base unit that supports the light source unit and the translucent cover such that the second area is positioned closer to the light source unit than the first area.

(2) The bulb-type light source apparatus according to (1), in which
the light source unit is formed annularly, and
the first area and the second area are provided about a virtual center axis that passes a center of the ring.

(3) The bulb-type light source apparatus according to (2), further including
a functional component supported by the base unit.

(4) The bulb-type light source apparatus according to (3), in which
the functional component is arranged at a position that passes the center axis, and
the first area and the second area are arranged in a periphery of the functional component.

(5) The bulb-type light source apparatus according to (3) or (4), in which
the translucent cover includes
a first end portion that forms an opening where the functional component is arranged, and
a second end portion provided on the other side of the first end portion in a direction of the center axis,
the first area is provided at the first end portion, and
the second area is provided across an area between the first area and the second end portion.

(6) The bulb-type light source apparatus according to any one of (1) to (5), in which
an average thickness of the first area is larger than that of the translucent cover.

(7) The bulb-type light source apparatus according to any one of (2) to (5), further including
a cylindrical light guide plate including an outer surface, a light-incident end surface opposing the light source unit, and an optical pattern portion configured to emit, from the outer surface, light that has entered from the light-incident end surface.

(8) The bulb-type light source apparatus according to (7), in which
the light guide plate includes an end edge that is provided on the other side of the light-incident end surface and opposes the first area.

(9) The bulb-type light source apparatus according to (8) in which
the translucent cover includes an apex at a position included in the first area on the other side of a side where the light source unit is arranged, and
the apex is arranged at a position deviated from a virtual extended line extending from the end edge in a direction extending from the light-incident end surface to the end edge along the side surface.

(10) The bulb-type light source apparatus according to (2), in which
the translucent cover includes
a first end portion, and
a second end portion that is provided on the other side of the first end portion in a direction of the center axis and includes an opening provided closer to the light source unit than the first end portion, and
a diameter of the opening of the second end portion is a maximum inner diameter of the translucent cover.

(11) The bulb-type light source apparatus according to (2), in which
the first area is further arranged in an area including a position where the center axis passes.

(12) A translucent cover used in a bulb-type light source apparatus including a light source unit and a base unit that supports the light source unit, the translucent cover including:
a first area including a convex lens function; and
a second area including a concave lens function,
the translucent cover being supported by the base unit such that the second area is positioned closer to the light source unit than the first area.

REFERENCE SIGNS LISTS

20 base unit
30 speaker
40, 140 light source unit
50, 150 translucent cover
50a first opening
50b second opening
50c first end portion
50d second end portion
50e side portion
50f apex
51, 151 first area
52, 152 second area
62 end edge
100, 200 bulb-type light source apparatus
150b opening

What is claimed is:

1. A bulb-type light source apparatus, comprising:
a light source unit, wherein the light source unit is formed annularly;
a translucent cover including a first area including a convex lens function and a second area including a concave lens function, wherein the first area and the second area are provided about a virtual center axis that passes a center of a ring;
a cylindrical light guide plate including an outer surface, a light-incident end surface opposing the light source unit, and an optical pattern portion configured to emit, from the outer surface, light that has entered from the light-incident end surface, wherein the light guide plate includes an end edge that is provided on another side of the light-incident end surface and opposes the first area;
a base unit that supports the light source unit and the translucent cover such that the second area is positioned closer to the light source unit than the first area, wherein the translucent cover includes an apex at a position included in the first area on the other side of a side where the light source unit is arranged, and wherein the apex is arranged at a position deviated from a virtual extended line extending from the end edge in a direction extending from the light-incident end surface to the end edge along the side surface.

2. The bulb-type light source apparatus according to claim 1, further comprising
a functional component supported by the base unit.

3. The bulb-type light source apparatus according to claim 2, wherein
the functional component is arranged at a position that passes the center axis, and
the first area and the second area are arranged in a periphery of the functional component.

4. The bulb-type light source apparatus according to claim 2, wherein
the translucent cover includes
a first end portion that forms an opening where the functional component is arranged, and
a second end portion provided on the other side of the first end portion in a direction of the center axis,
the first area is provided at the first end portion, and
the second area is provided across an area between the first area and the second end portion.

5. The bulb-type light source apparatus according to claim 1, wherein
an average thickness of the first area is larger than that of the translucent cover.

6. The bulb-type light source apparatus according to claim 1, wherein
the translucent cover includes
a first end portion, and
a second end portion that is provided on the other side of the first end portion in a direction of the center axis and includes an opening provided closer to the light source unit than the first end portion, and
a diameter of the opening of the second end portion is a maximum inner diameter of the translucent cover.

7. The bulb-type light source apparatus according to claim 1, wherein
the first area is further arranged in an area including a position where the center axis passes.

8. The bulb-type light source apparatus according to claim 2, wherein the functional component is a speaker.

9. The bulb-type light source apparatus according to claim 1, wherein the base unit includes a base casing, and a heatsink.

10. The bulb-type light source apparatus according to claim 9, wherein the base unit further includes a holding member that is fixed onto the heatsink, wherein the holding member holds a functional component, and wherein the functional component is a speaker.

11. The bulb-type light source apparatus according to claim 10, wherein the base unit further includes an accommodation box.

12. The bulb-type light source apparatus according to claim 11, wherein the accommodation box accommodates at least a first circuit substrate.

13. The bulb-type light source apparatus according to claim 12, wherein the at least a first circuit substrate is a power supply circuit substrate.

14. The bulb-type light source apparatus according to claim 13, wherein the power supply circuit substrate is annular.

15. The bulb-type light source apparatus according to claim 14, wherein the power supply circuit substrate is fixed to the heatsink.

16. The bulb-type light source apparatus according to claim 9, wherein the light source unit is arranged on the heat sink.

17. The bulb-type light source apparatus according to claim 12, wherein the at least a first circuit substrate includes a drive circuit for the speaker.

18. The bulb-type light source apparatus according to claim 11, wherein the accommodation box accommodates a power supply circuit and a drive circuit for the speaker.

* * * * *